United States Patent [19]

Silverberg

[11] Patent Number: 5,072,303

[45] Date of Patent: Dec. 10, 1991

[54] COMBINED PRINTER AND FACSIMILE APPARATUS WHICH SCANS USING DIFFERENT SCAN RATES AND DOT SIZES

[76] Inventor: Morton Silverberg, 24 Edgewater Common, Westport, Conn. 06880

[21] Appl. No.: 459,058

[22] Filed: Dec. 29, 1989

[51] Int. Cl.[5] .................. H04N 1/21; H04N 1/23; H04N 1/17; H04N 1/00
[52] U.S. Cl. .................. 358/296; 355/202; 358/300; 358/401; 358/442; 358/486
[58] Field of Search ............. 355/202; 358/300, 426, 358/437, 442, 445, 468, 486, 400, 401, 459, 444, 296

[56] References Cited

U.S. PATENT DOCUMENTS

| | | | |
|---|---|---|---|
| 3,830,962 | 7/1974 | Mailoux | 178/6 |
| 4,291,341 | 9/1981 | Yajima | 358/300 |
| 4,383,755 | 5/1983 | Fedder et al. | 355/11 |
| 4,549,222 | 10/1985 | Fogaroli | 358/296 |
| 4,575,214 | 3/1986 | Carley | 355/3 R |
| 4,593,323 | 6/1986 | Kanda et al. | 379/100 |
| 4,652,933 | 3/1987 | Koshiishi | 358/256 |
| 4,702,630 | 10/1987 | Igi et al. | 358/296 X |
| 4,754,300 | 6/1988 | Fuka | 355/3 R |
| 4,794,419 | 12/1988 | Shibazaki | 355/3 R |
| 4,814,798 | 3/1989 | Fuka et al. | 346/160 |
| 4,860,115 | 8/1989 | Ogura | 358/300 X |
| 4,930,017 | 5/1990 | Izawa | 358/468 X |
| 4,942,406 | 7/1990 | Tsuda | 358/296 X |
| 4,947,345 | 8/1990 | Paradise | 358/442 X |
| 4,953,036 | 8/1990 | Yoshimura | 358/400 |
| 4,959,731 | 9/1990 | Fukae | 355/202 X |

OTHER PUBLICATIONS

"Hydra" Evolves to Combine: Fax Printer, Copier Wall, St. Journal, 2/22/90.

*Primary Examiner*—Benjamin R. Fuller
*Assistant Examiner*—Eric Frahm
*Attorney, Agent, or Firm*—Robert H. Whisker; Melvin J. Scolnick; David E. Pitchenik

[57] ABSTRACT

A combined PC laser printer and fax reproduction apparatus where the scanning speed and spot size of the laser beam are controlled to be different for the reproduction of signals received from a computer and for fax signals, and the memory of the apparatus is controlled to have two pages when reproducing fax signals, such that the parameters of operation are optimum for both functions.

9 Claims, 2 Drawing Sheets

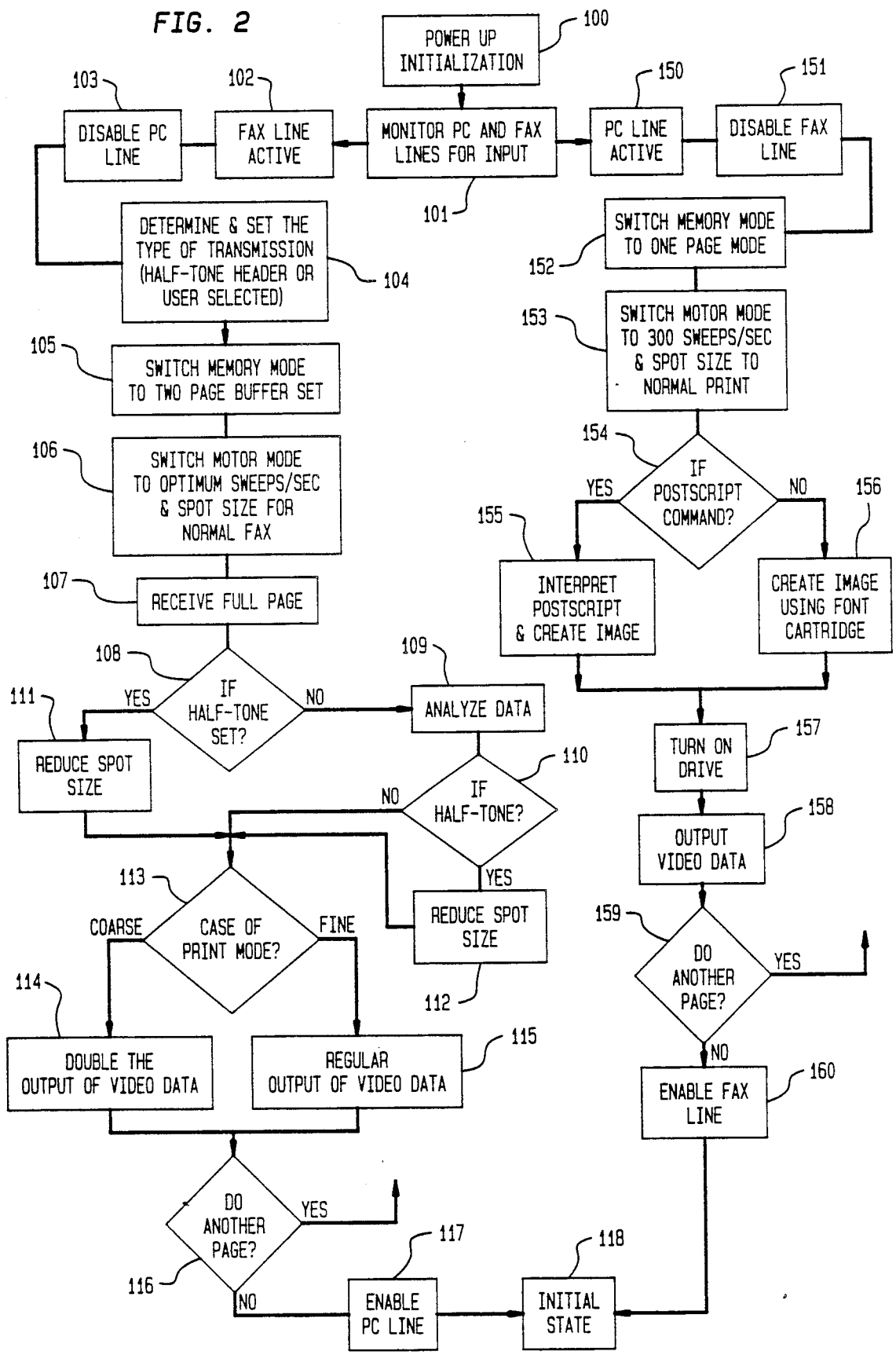

COMBINED PRINTER AND FACSIMILE APPARATUS WHICH SCANS USING DIFFERENT SCAN RATES AND DOT SIZES

FIELD OF THE INVENTION

This invention relates to a printing device and a method for using the same, and is especially directed to a laser printer of the type adapted to serve as a printer for a microcomputer, wherein the device is especially adapted to receive and print facsimile images.

BACKGROUND OF THE INVENTION

Laser printers for printing images in response to the reception of signals from a microcomputer, such as an IBM PC or the like, are well known. In a typical printer of this type, a memory is provided for storing image signals from the microcomputer. The microcomputer formats the signals in the manner required for the printer, and the printer memory is adapted to store bit mapped image pages of images prior to initiating printing. The printer sequentially reads out from the bit mapped memory to modulate the light beam of a laser diode. The light beam of the laser diode is controlled to scan a photoconductive drum, for example by the use of a rotating polygonal mirror. The image thus stored on the drum is then developed and transferred to paper or the like in a manner conventional to xerographic copying devices.

Typical laser printers of this type are disclosed, for example, in U.S. Pat. Nos. 3,816,652; 4,383,755 and 4,783,680.

Laser printers of this type are generally controlled to provide resolutions of about 300 dpi. Vertical resolution is a function of the rotational rate of the polygon mirror, while horizontal resolution is determined by the control rate of switching of the laser diode.

In the conventional use of a laser printer to print fax images, an accompanying microcomputer is provided with a fax modem, and circuitry adapted to demodulate and decompress the signals. The microcomputer converts the signals to be compatible with the format of the laser printer, and transmits signals in accordance with this format to the printer.

This technique has a number of disadvantages resulting from the different resolutions of the fax images and the normal printer characteristics. Thus, group 3 fax operates at resolutions of approximately 96×204 or 196×204 lines per inch. Since the resolutions of the fax images are not even submultiples of the resolution of the conventional printer images, interpolations must be provided to match the fax images to the format of the normal printer resolution, and various lines of the image must be repeated. This results in degradation of the printed fax image.

Even greater degradation occurs with half tone images since the spot size is too large. A further disadvantage of the above technique is that the page throughput rate is very slow. The inputting of the fax signals directly into the microcomputer also does not provide a ready source of signals for the screen display of the microcomputer, due to the substantially lower resolution of the screen. In addition, this technique requires the provision of a modem, fax board and analog phone line connected to each microcomputer, and frequently does not permit use of the respective microcomputer during the reception of a fax message.

Consequently, current laser engines are adapted to serve either as a fax printer or a printer for microcomputer signals, but not both.

SUMMARY OF THE INVENTION

The present invention is therefore directed to the provision of an economical laser printer or the like having the capability of directly receiving and printing fax images that ar not restricted by the parameters selected or its operation as a PC printer. Accordingly the invention provides an apparatus that permits time sharing of the laser printer for a computer printing function and a fax image printing function, while requiring only a negligable cost increase over the system cost for the computer printer function.

Briefly stated, a laser printing apparatus has a first port for receiving image signals, a memory for storing a bit map of an image corresponding to said image signals, a photoconductive surface, a source of a laser light beam, means for modulating the laser light beam with signals from said memory, and means for scanning said laser light beam across said photoconductive surface at a given rate. In accordance with the invention, a source of demodulated and decompressed fax signals is provided, and means are provided for storing either a 200×100 or 200×200 pixel/inch bit map of images corresponding to said demodulated and decompressed fax signals in the memory. Means are also provided for controlling the scanning means to scan the surface at a rate that differs from the rate selected for use as a computer printer.

The apparatus means for controlling the scanning is preferrably responsive to the receipt of demodulated and decompressed fax signals to change the speed of scanning of the laser light beam. The source of demodulated and decompressed fax signals preferrably comprises a second port for receiving fax signals, and means for demodulating and decompressing signals from the second port. The apparatus for scanning may comprise a polygonal mirror positioned in the optical path of the light beam, and a motor for rotating mirror, whereby the means for controlling said scanning means comprises means for controlling the rpm of the motor.

In a further feature, a laser printing apparatus has a first port for receiving image signals, memory means for storing a bit map of an image corresponding to the image signals, a photoconductive surface, a source of a laser light beam, means for controlling the light beam to have a given spot size, means for modulating the laser light beam with signals from the memory, and means for scanning the laser light beam across the photoconductive surface at a given rate. In accordance with the invention, a source of demodulated and decompressed fax signals is provided, as well as means for storing a bit map of an image corresponding to the demodulated and decompressed fax signals in the memory. Means are also provided for controlling the spot size changing means to change the spot size of the laser light beam to differ from the spot size chosen for computer printing.

In this apparatus, the means for controlling the spot size changing means may comprise means responsive to receipt of the demodulated and decompressed fax signals for controlling the spot size controlling means. The source of demodulated and decompressed fax signals may comprise a second port for receiving fax signals, and means for demodulating and decompressing signals from the second port. The means for changing the spot size may comprise means for pulse width modulation of the laser light beam.

In accordance with a still further feature of the invention, a laser printing apparatus has a first port for receiving image signals, memory means for storing a page of a bit map of an image corresponding to the image signals, a photoconductive surface, a source of a laser light beam, means for modulating the laser light beam with signals from the memory, and means for scanning the laser light beam across the photoconductive surface at a given rate. In this embodiment of the invention, a source of demodulated and decompressed fax signals is provided, and means are provided for storing one or more bit maps of a page of an image corresponding to the demodulated and decompressed fax signals in a portion of the memory while reading out a bit map of another page of an image corresponding to the demodulated and decompressed fax signals to modulate the laser light beam.

The invention also provides a method for producing copies of images in a laser printer of the type having a source of first and second image signals, memory means for storing a bit map of an image corresponding to the first and second image signals, a photoconductive surface, a source of a laser light beam, means for modulating the laser light beam with signals from the memory, and means for scanning the laser light beam across the photoconductive surface. In accordance with one feature of this method, the scanning means is controlled to scan the surface at a first rate while modulating the light beam with signals from the memory corresponding to the first image signals, and to subsequently control the scanning means to scan the surface at a second rate different from the first rate while modulating the light beam with signals from the memory corresponding to the second image signals.

Still further, the invention provides a method for producing copies of images in a laser printer of the type having a source of first and second image signals, memory means for storing a bit map of an image corresponding to the first and second image signals, a photoconductive surface, a source of a laser light beam, means for modulating the laser light beam with signals from the memory, and means for scanning the laser light beam across the photoconductive surface. In this feature of the invention, the source of a laser light beam is controlled to produce a beam having a first spot size while modulating the light beam with signals from the memory corresponding to the first image signals, and to subsequently control the source of a laser light beam to produce a beam having a second spot size different from the first spot size while modulating the light beam with signals from the memory corresponding to the second image signals.

BRIEF DESCRIPTION OF THE DRAWING

In order that the invention may be more clearly understood, it will now be disclosed in greater detail with reference to the accompanying drawing, wherein:

FIG. 2 is a flow diagram illustrating one technique for controlling the apparatus of FIG. 1.

DETAILED DISCLOSURE OF THE INVENTION

Figure 1:
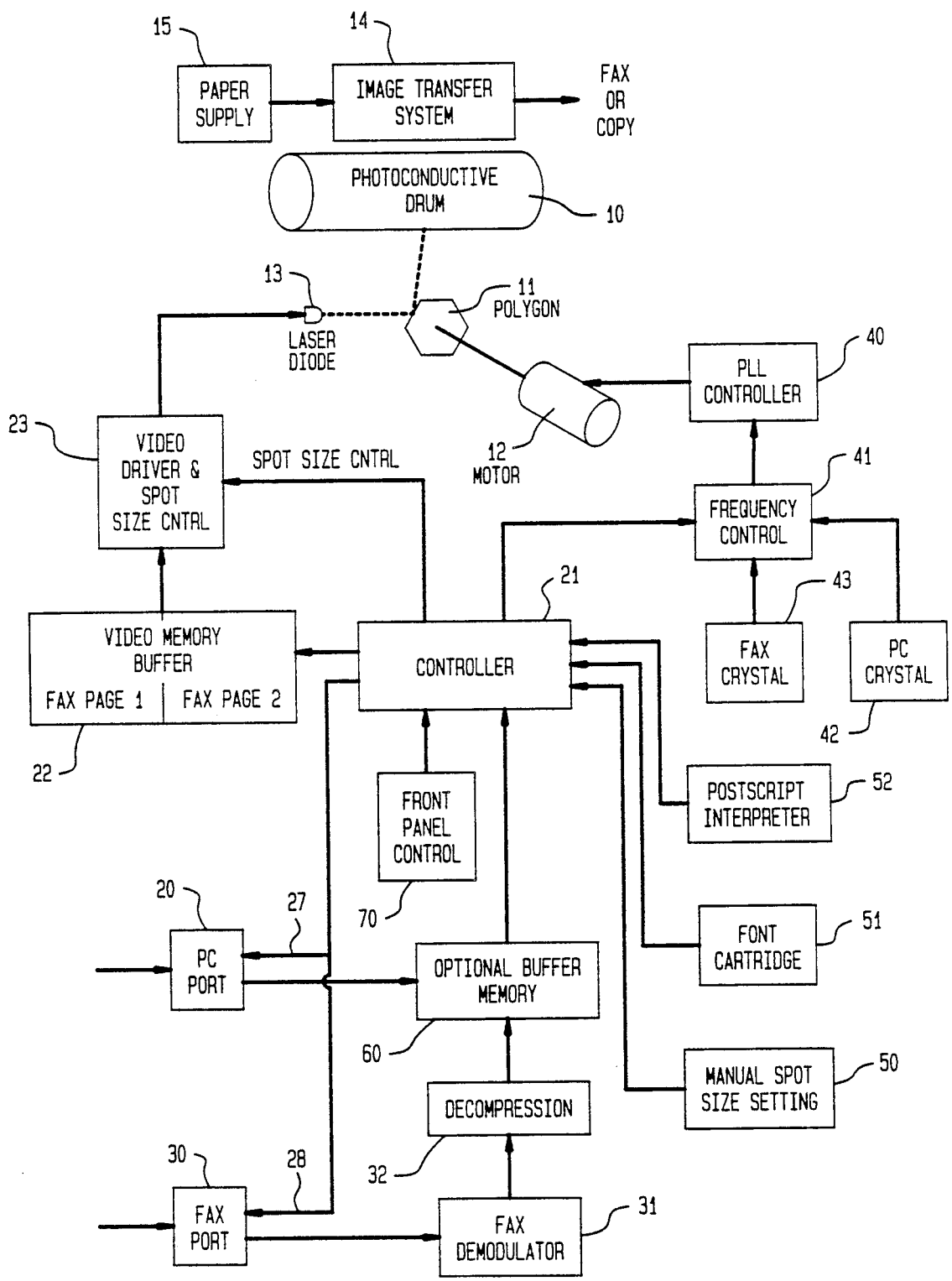
FIG. 1 is a block diagram of one embodiment of a microcomputer printer/fax printer apparatus in accordance with the invention.

Referring now to FIG. 1, a conventional printer apparatus is provided comprising a photoconductive drum 10, a rotatable polygon mirror 11, a motor 12 for rotating the polygon mirror, and a laser diode 13 directing a light beam toward the mirror, whereby the laser light beam scans the photoconductive drum. A conventional transfer system 14 is provided for transferring the image on the drum 10 to paper from a paper supply 15. Image signals received at the port 20, for example a port for receiving signals from a microcomputer, are applied by a controller 21 to a video memory buffer 22. The controller 21 controls the application of the image signals stored in the buffer 22 to a video driver 23 for modulating the light beam of the laser diode 13.

In accordance with the invention, the apparatus also includes a fax port 30 for receiving facsimile signals, for example via a telephone line. The fax signals are demodulated and decompressed in the conventional manner in the demodulator 31 and decompressor 32, and applied under the control of the controller to the video memory buffer 22 for modulating the light beam of the laser diode 13 through video drive 23.

In accordance with the invention, it is preferred that the controller 21 control the storage of data in the video memory buffer 22, during fax reception, in two pages. During the time that data is being read out of each of the memory pages, the data for the next fax page is being written in the other memory page. This technique speeds the printing of the fax image. When printing "normal" Group III fax images at approximately 100×200 lines per inch, the memory can be devided into thirds to further aid the fax printer throughput.

In order to avoid conflict between operation of the printer in the conventional manner, and operation thereof to print fax images, the controller 21 may be provided with control lines 27, 28 to block reception of microcomputer or fax images from the ports 20 and 30 when data is being received from the other port. Such blocking of a port should be effected such that a busy signal is communicated to the input line that is not currently active.

As discussed above, the motor 12 of conventional laser printers rotates the mirror at a rate to provide a printer resolution of about 300 dpi. This resolution is not desirable for fax images which may have resolutions of, for example, about 96×204 or 196×204 lines per inch. Therefore, in accordance with one feature of the invention, the motor 12 is controlled by the controller 21 to adjust the speed thereof for fax reproduction. This may be effected, for example, by controlling the speed of the motor 12 with a PLL controller 40, the frequency of operation of the PLL controller being controlled by a frequency control circuit 41. For example a crystal 42 having one operating frequency may be employed by the frequency control circuit 41 for printing of images in response to image signals from the microcomputer, and a second crystal 43 may be employed by the frequency control circuit 41 for printing of images in response to the reception of fax signals at the fax port 30. It is of course apparent that more than one crystal may be provided for selective operation at different resolutions during the reception of fax signals, and that other techniques ma be employed for controlling the speed of the motor.

In accordance with a further feature of the invention, it is also desirable to control the spot size of the laser beam for the printing of images corresponding to signals received from the microcomputer and fax images. For example, when images are derived from the microcomputer, it is desirable to provide a spot size that is optimized for printing text and solid areas at 300 dpi. This spot size tends to be too small for printing fax text an solids and too large for fax half tones, however, and hence it has also been found desirable to vary the spot sizes for printing "normal" fax at approximately 100 vertical scan lines per inch (for 96×204 lines per inch) and "fine" at approximately 200 vertical lines per inch (for 196×204 lines per inch and the "normal" and "fine" half-tone fax images). For this purpose, for example, the video driver 23 system may provide for pulse width modulation of light beam. This technique serves to effect a change in the spot size height as well as width since the laser printer employs xerographic printing techniques, and, in exposing a xerographic image with bias, there is a development threshold. Alternatively, the spot size may be controlled by controlling the drive current flowing through the laser diode, or optical diffusion may be employed by the mechanical control of suitable optical elements in the optical path of the light beam.

The system illustrated in FIG. 1 may also include a manual spot size setting control 50 enabling the operator to determine the size of the dots of the printed image. This control may comprise, for example, several switches, whereby the controller may be programmed to sample the switches to ascertain the desired spot size. In addition, the printer may include one or more font cartridges 51 for use by the controller in establishing a bit map of the images corresponding to signals received from the microcomputer, as well as a Postscript interpreter 52 to enable use of the Postscript protocol.

The system may optionally be provided with a buffer 60 for storage of data received from either the PC port 20 or the Fax port 30. This buffer may be controlled by the controller 21 to store data received from either of these ports whenever the other port is currently busy, in order to avoid the necessity of blocking each port, as discussed above, when the other port is receiving signals.

The system is also provided with a front panel control 70, enabling control of further functions of the system.

Referring now to the flow diagram of FIG. 2, after the apparatus is powered up and initialized (Block 100), the PC port and Fax port are monitored for the reception of input signals (Block 101). If the Fax port becomes active before the PC port (Block 102), the PC port is then disabled (Block 103) unless a buffer memory 60 has been provided. The signals are then analyzed to determine the type of transmission (half-tone, user, or under control of the user via the front panel control 70)(Block 104). The mode of operation of the memory is now set by the controller to define two memory pages for fax reception, as above discussed (Block 105) and the speed of the motor and the size of the spot are adjusted to be optimum for normal fax reception (Block 106). For example, the motor may be controlled at a rate such that each line of the image may be scanned exactly twice on the photoconductive surface. Alternately, each line of the image may be scanned only a single time onto the photoconductive surface if the shape of the spot is controlled to be elliptical for fax images. For this purpose, the controller may introduce a non-spherical optical element in the optical path during fax reproduction.

A full page of the fax signals is now received (Block 107). If a front panel switch is set to display half tone (Block 108), or if an analysis of the data (Block 109) results in the sensing of a half tone image signals (Block 110), the spot size of the beam is reduced (Blocks 111, 112). If the printing mode is set to be coarse (Block 113), for example at the front panel, the output of the video data is doubled (Block 114). Otherwise the regular video is output to the video memory buffer page in which data is currently being stored. Following the storing of a full page, a test is made (Block 116) to determine if another page of data is to be received. If so, the program jumps back to Block 107. Otherwise, the PC port is now enabled (Block 117) to return the apparatus to its original state.

If signals had first been received at the PC port (Block 150), the Fax port is disabled (Block 151) unless a buffer memory 60 has been provided, and the video memory is controlled to be operative as a single page memory (Block 152). The motor 12 is now controlled to provide 300 sweeps/inch, and the spot size is controlled to have its normal size for conventional prints (Block 153). It the print commands are Postscript commands (Block 154), the interpreter 52 is called (Block 155) to enable the interpretation of the signals. Otherwise the font cartridge 51 is employed to develop the bit map in the memory 22 for the image. The paper drive of the printer is now turned on (Block 157) and the video data is output to the video drive to control the laser diode. Following the printing of the page, the program jumps back (Block 159) to Block 154 if another page is to be printed. Otherwise the Fax port is enabled (Block 160) and the system returns to its initial state (Block 118).

The system of the invention therefore enables the use of a laser printer of the type conventionally employed for printing the outputs o microcomputers and the like, to also print fax images. The system requires a minimum of modification of the conventional printing structure, and hence provides an inexpensive solution to the problem of printing quality fax images. The quality of the reproductions are much better than obtainable with conventional thermal fax devices, especially since the reproductions may be made on plain paper.

It is of course apparent that digital filtering may be provided for the fax signals, if desired, to reduce image raggedness and noise.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A printing apparatus, comprising:
   a) a first input means for input of image signals representative of an image;
   b) a second input means for input of fax signals representative of a facsimile;
   c) means selectively responsive to said image signals for printing said image in a first mode and to said fax signals for printing said facsimile in a second mode;
   d) said printing means including means for selectively scanning a laser beam at a first rate corresponding to a resolution of said image signals in said first mode, and for scanning said laser beam at a second rate corresponding to a resolution of said fax signals in said second mode;
   e) means for detecting input of said fax signals;
   f) means responsive to said detecting means for selecting said second mode for said printing means;

g) means for determining characteristics of said fax signals;

h) means responsive to said determining means for further adjusting performance of said printing means in said second mode.

2. A printing apparatus as described in claim 1, wherein said first input means includes means for disabling said second input means when said image signals are input, and said second input means includes means for disabling said first input means when said fax signals are input.

3. A printing apparatus as described in claim 1 wherein said determining means includes means for analyzing said fax signal to determine said characteristics.

4. A printing apparatus as described in claim 3 wherein said characteristics include representation of a half-tone facsimile, and said adjusting means responds to determination that said fax signal represents a half-tome facsimile to reduce a spot size of said laser beam.

5. A printing apparatus as described in claim 1 wherein said determining means includes means for input by an operator of signals identifying said characteristics.

6. A printing apparatus as described in claim 5 wherein said characteristics include representation of a half-tone facsimile, and said adjusting means responds to a determination that said fax signal represents a half-tome facsimile to reduce a spot size of said laser beam.

7. A printing apparatus as described in claim 1 wherein said characteristics include representation of a coarse image facsimile, and said adjusting means responds to a determination that said facsimile represents a coarse image facsimile to control the printing means to print each line of said fax signal as two lines of said facsimile.

8. A printing apparatus as described in claim 7 wherein said printing means is controlled to print each line of said fax signal twice as successive lines of said facsimile.

9. A printing apparatus as described in claim 7 wherein a spot of said laser beam is transformed to an elliptical shape covering two successive lines of said facsimile, whereby each line of said fax signal is printed as two lines of said facsimile.

* * * * *

(12) EX PARTE REEXAMINATION CERTIFICATE (7425th)
United States Patent
Silverberg

(10) Number: US 5,072,303 C1
(45) Certificate Issued: Mar. 30, 2010

(54) COMBINED PRINTER AND FACSIMILE APPARATUS WHICH SCANS USING DIFFERENT SCAN RATES AND DOT SIZES

(75) Inventor: Morton Silverberg, Westport, CT (US)

(73) Assignee: Pitney Bowes Inc., Stamford, CT (US)

Reexamination Request:
No. 90/009,441, Mar. 31, 2009

Reexamination Certificate for:
Patent No.: 5,072,303
Issued: Dec. 10, 1991
Appl. No.: 07/459,058
Filed: Dec. 29, 1989

(51) Int. Cl.
*G06K 15/12* (2006.01)
*H04N 1/32* (2006.01)
*H04N 1/04* (2006.01)
*H04N 1/00* (2006.01)
*H04N 1/12* (2006.01)

(52) U.S. Cl. .......................... 358/296; 355/202; 358/300; 358/401; 358/442; 358/486; 399/1

(58) Field of Classification Search .................. None
See application file for complete search history.

(56) References Cited

U.S. PATENT DOCUMENTS

| 4,661,859 A | 4/1987 | Mailloux et al. ............. 358/283 |
| 4,802,105 A | 1/1989 | Suzuki ........................ 364/519 |
| 4,922,349 A | 5/1990 | Abe et al. .................... 358/443 |
| 4,926,268 A | 5/1990 | Kawamura et al. ........... 358/458 |

FOREIGN PATENT DOCUMENTS

| JP | 62-183265 | 8/1987 |
| JP | 63-23467  | 1/1988 |
| JP | 63-31270  | 2/1988 |

*Primary Examiner*—Pia Tibbits

(57) ABSTRACT

A combined PC laser printer and fax reproduction apparatus where the scanning speed and spot size of the laser beam are controlled to be different for the reproduction of signals received from a computer and for fax signals, and the memory of the apparatus is controlled to have two pages when reproducing fax signals, such that the parameters of operation are optimum for both functions.

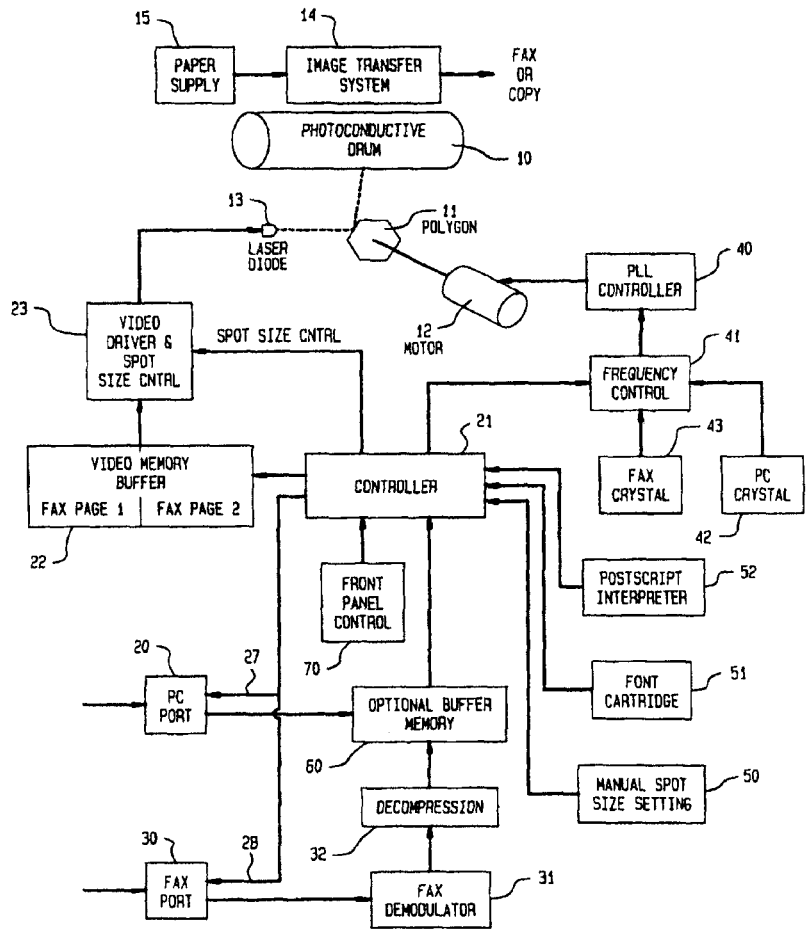

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 9 is confirmed.

Claims 1, 7 and 8 are cancelled.

Claims 2–6 were not reexamined.

* * * * *